J. B. JOHNSON.
CULTIVATOR.
APPLICATION FILED JULY 7, 1914.
1,144,039.
Patented June 22, 1915.
2 SHEETS—SHEET 2.
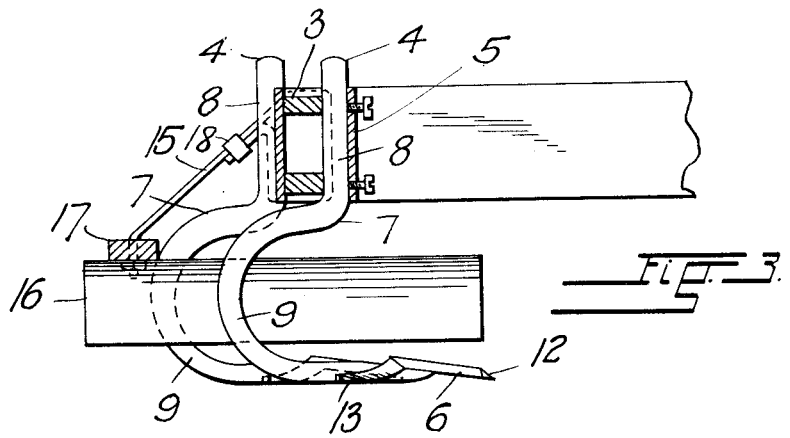
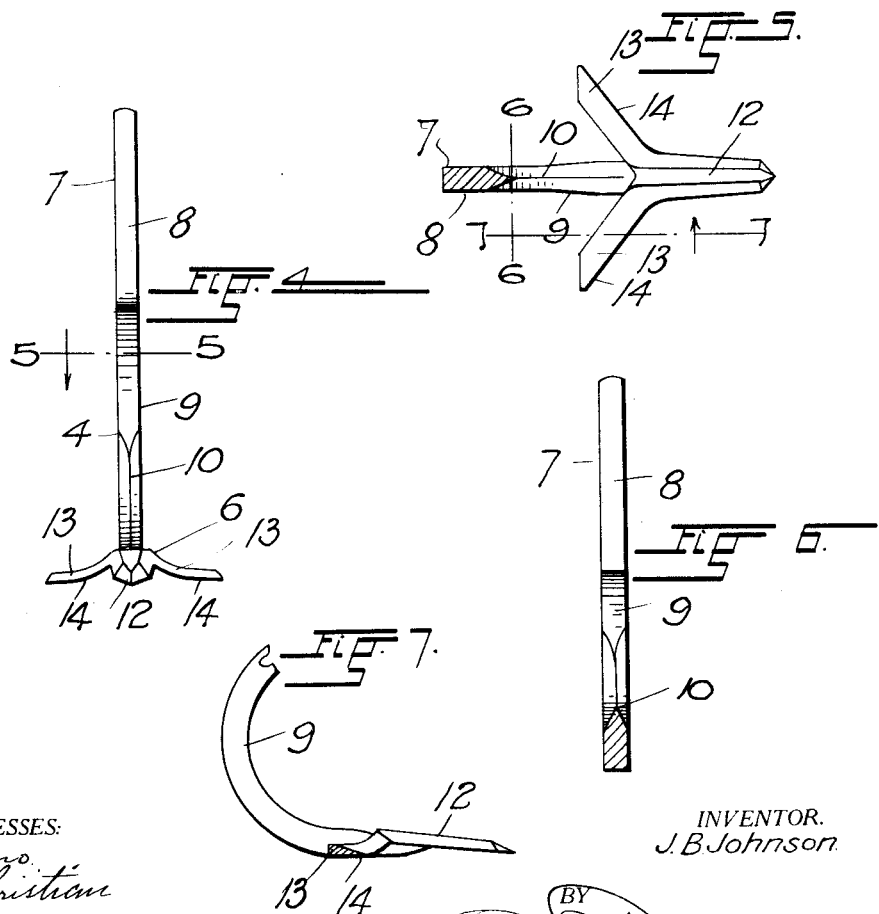
WITNESSES:
F. H. Curro.
S. C. Christian
INVENTOR.
J. B. Johnson
BY
ATTORNEY.

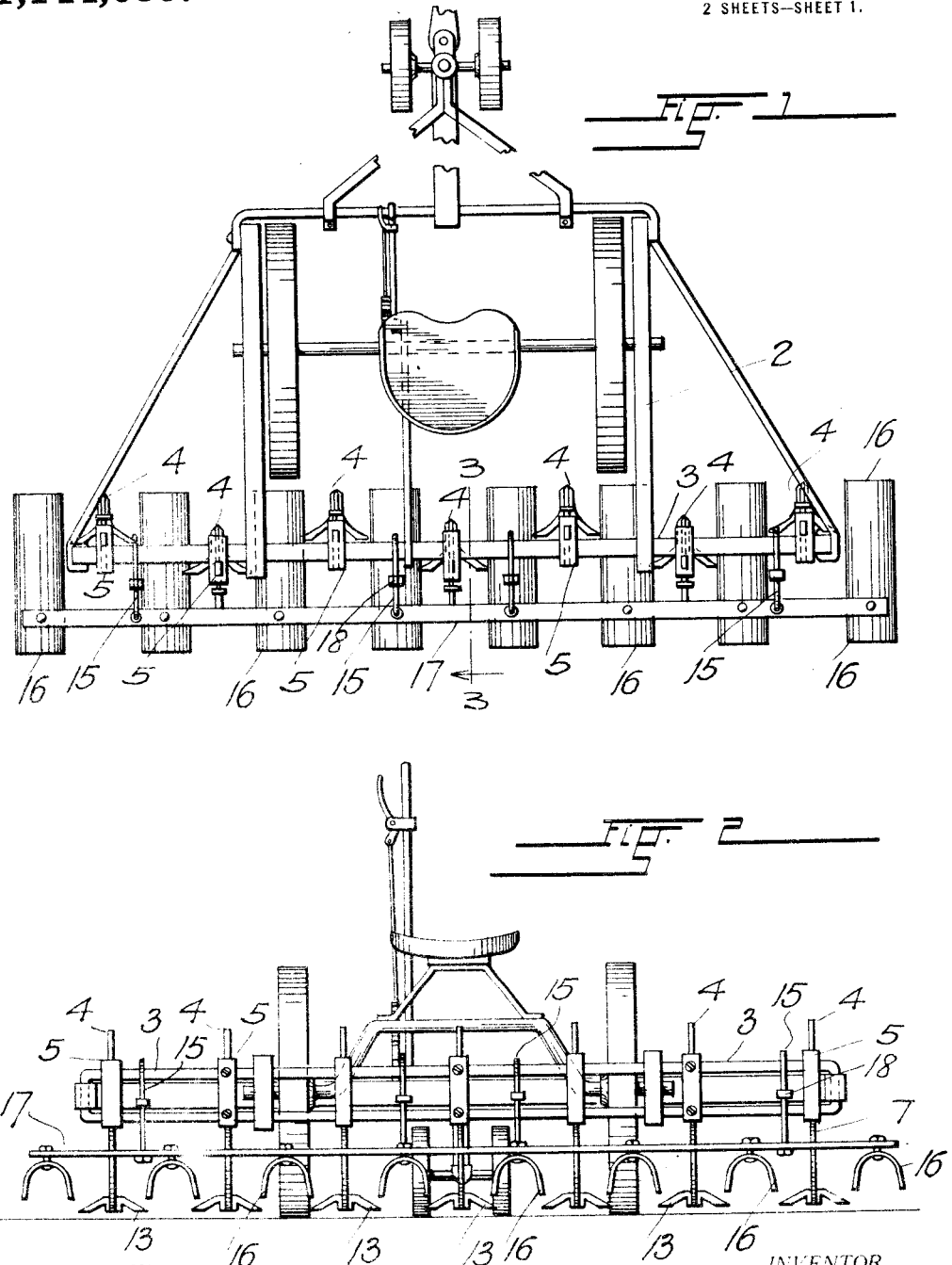

UNITED STATES PATENT OFFICE.

JOHN B. JOHNSON, OF FORT COLLINS, COLORADO.

CULTIVATOR.

1,144,039.  Specification of Letters Patent.  Patented June 22, 1915.

Application filed July 7, 1914. Serial No. 849,379.

*To all whom it may concern:*

Be it known that I, JOHN B. JOHNSON, a citizen of the United States, residing at Fort Collins, in the county of Larimer and State of Colorado, have invented certain new and useful Improvements in Cultivators, of which the following is a specification.

My invention relates to new and useful improvements in cultivators of the type employed for thinning standing crops such as sugar beets and corn.

In cultivating beets and other plants of the same character by the ordinary method of hoeing the rows of plants into hills and then thinning the plants contained in the latter, by hand, the work of hoeing not only requires much time, care and labor, but it leaves the ground around the hills in a hard and smooth condition which makes subsequent thinning of the plants very difficult and which is conducive of producing alkali-crusts around the plants which retard and impair their growth.

It is the primary object of my invention to facilitate and improve the above outlined work of cultivation, by the provision of a wheel-supported machine which when drawn across the field by draft animals, will quickly and effectively divide the plants into hills, which at the same time loosens and works the ground around these hills to facilitate subsequent thinning and improve the growing conditions of the plants retained, and which, while the rows are thus being cultivated and divided, protects the remaining plants from injury by violent contact of rocks and dirt loosened in the operation.

An embodiment of my invention has been shown in the accompanying drawings in the various views of which like parts are similarly designated, and in which, Figure 1 is a plan view of my improved cultivator, Fig. 2, a rear elevation of the same, Fig. 3, an enlarged section taken along the line 3—3, Fig. 1, Fig. 4, a face view of one of the cultivating tools comprised in the construction of the machine, Fig. 5, a section taken along the line 5—5, Fig. 4, drawn to a somewhat larger scale, Fig. 6, a section taken along the line 6—6, Fig. 5, and Fig. 7, a section taken along the line 7—7, Fig. 5.

Referring to the drawings by numerical reference characters, my improved cultivator comprises a carrier composed of a wheel-supported frame 2 which may be of any suitable size and construction. The carrier has at its front end, means for the attachment of the draft animals by which it is drawn across the field to be cultivated, and it has at its opposite end a transverse bar 3 to which the elements which effect the cultivation of the plants in the advantageous manner hereinabove set forth, are assembled. The most essential of these elements are a series of cultivating tools 4 which are adjustably connected to the bar by means of clamps 5 to be raised or lowered in accordance with the depth at which it is desired to work the ground. Each of these tools, which are shown and described in my Letters Patent No. 1,134,538 dated April 6, 1915, comprise as best shown in Figs. 4 to 7 of the drawings, a blade 6 which projects forwardly at the lower end of a shank 7. The shank is composed of a straight portion 8 by means of which it is attached to the cross-bar 3 and a curved lower portion 9 at the extremity of which the blade is attached so as to project forwardly at substantially right angles to the longitudinal axis of the shank. The curved portion of the shank is curved at its front edge as indicated at 10 in the drawings, for the purpose of dividing the roots, plants and dirt which are dislodged by the action of the blades, thereby preventing their accumulation above the latter, and consequent interference with the proper operation of the tool.

The blade 6 which as stated before is secured at the lower end of the shank in a forwardly projecting position, is composed of three integral members which in the operation of the machine coöperate to produce the desired results. Two of the members of the blade extend divergently rearwardly from the rear end of the central, forwardly projecting member 12 of the same with which they are formed integral. The function of the middle member 12 is to break the ground for the proper operation of the other members which cut the plants and at the same time loosen the soil between the hills of plants, and it consists with this purpose in view, of a slender, sharp-edged, pointed and slightly tapering tooth which readily penetrates the hardest ground and loosens the same to provide a path for the other laterally projecting members 13. The last mentioned parts of the blades are like the middle member of slender and slightly tapering form and their forward edges 14 are sharpened to cut the plants and loosen the soil.

Suspended from the cross bar 3 are a series of protective shields 16 which are arranged in alternate order with relation to the cultivating tools. The shields which are assembled on a cross-beam 17 are of inverted trough-shape form and extend longitudinally in the direction in which the machine moves during its operation. They are elevated to a plane above that of the tool blades to extend above the surface of the ground through which the latter move at a depth which varies in accordance with the nature of the plants and the condition of the soil. The series of shields is suspended from the bar 3 by a plurality of straps 15 which at their lower ends are attached to the bar 17 and which at their opposite extremities are detachably connected with the cross bar. In the construction shown in the drawings the detachable connection between the bar and the straps is established by looping the end portions of the latter around the bar and securing the extremities of the same by means of sliding bands 18.

In the operation of my improved cultivator, it is drawn across the field to be cultivated, transversely to the rows of plants, with the blades of the tools at the required distance beneath the surface of the soil and with the shields a short distance above the same. The forwardly projecting middle members 12 of the tool blades, loosen the soil in advance of the divergent knife members 13 which cut the plants along the entire width of the blades, thereby dividing the rows into hills which during this operation are protected from the violent contact of the loosened dirt and stones, by the shields. The tools 4 loosen and work the earth in close proximity to the hills of plants, which greatly facilitates subsequent thinning and promotes the growth of the remaining plants. The curved, sharp-edged portions of the tool-shanks, prevent as hereinbefore explained, the accumulation of dirt, roots, and plants on the tools by providing a space rearwardly of the working parts of the same, in which the loosened and severed matter collects to be subsequently cut and thrown aside by contact with the sharpened edges of the shanks.

Having thus described my invention what I claim and desire to secure by Letters-Patent is:

1. In a cultivator, a carrier including a transverse bar, a series of cultivating tools mounted on said bar to be driven through the ground over which the carrier is propelled, and a series of interconnected plant-covering shields collectively suspended from the bar so as to place the shields in alternate order with relation to the tools and at a short distance above the surface of the ground.

2. In a cultivator, a carrier including a transverse member, a series of cultivating tools mounted thereon, a second transverse member attached to the first-mentioned member, and a series of plant-covering shields connected with the said second member so as to be positioned in alternate order with relation to the said tools.

3. In a cultivator, a carrier including a transverse member, a series of cultivating tools mounted thereon, a second transverse member removably attached to the first-mentioned member, and a series of plant-covering shields connected with the said second member so as to be positioned in alternate order with relation to the said tools.

In testimony whereof I have affixed my signature in presence of two witnesses.

JOHN B. JOHNSON.

Witnesses:
H. C. LIGHTER,
ADDIE CLARKE ELLIS.